United States Patent [19]

Miura et al.

[11] Patent Number: 4,594,101

[45] Date of Patent: Jun. 10, 1986

[54] FINE COMPOSITE POWDER MATERIAL AND METHOD AND APPARATUS FOR MAKING THE SAME

[75] Inventors: Hirohisa Miura; Hiroshi Sato; Toshio Natsume; Hidenori Katagiri, all of Toyota, Japan

[73] Assignee: Toyota Jidosha Kabushiki Kaisha, Toyota, Japan

[21] Appl. No.: 608,167

[22] Filed: May 8, 1984

[30] Foreign Application Priority Data

May 10, 1983 [JP] Japan ................................. 58-81534

[51] Int. Cl.$^4$ ................................................ B22F 9/00
[52] U.S. Cl. ............................... 75/0.5 C; 75/0.5 BC; 75/252; 264/13; 425/6
[58] Field of Search ........... 75/0.5 B, 0.5 BA, 0.5 BB, 75/0.5 BC, 0.5 C, 252; 264/13; 425/6

[56] References Cited

U.S. PATENT DOCUMENTS

| | | | |
|---|---|---|---|
| 1,687,034 | 10/1928 | Newell | 75/88 |
| 1,803,720 | 5/1931 | Miner | 423/136 |
| 3,061,482 | 10/1962 | Grant | 75/252 |
| 3,069,759 | 12/1962 | Grant et al. | 75/252 |
| 3,143,789 | 8/1964 | Iler et al. | 75/252 |
| 3,352,637 | 11/1967 | Heymer et al. | 423/412 |
| 3,522,017 | 7/1970 | Barfield | 422/201 |
| 3,765,867 | 10/1973 | Evans et al. | 75/0.5 BC |
| 3,884,676 | 5/1975 | Nadkarni et al. | 75/0.5 BC |
| 3,901,689 | 8/1975 | Pelton | 75/0.5 BC |
| 4,191,556 | 3/1980 | Rothblatt | 75/0.5 B |
| 4,192,672 | 3/1980 | Moskowitz et al. | 75/252 |
| 4,278,622 | 7/1981 | Suh | 264/11 |
| 4,484,943 | 11/1984 | Miura et al. | 75/0.5 C |

OTHER PUBLICATIONS

European Search Report EP 84 10 5251.

*Primary Examiner*—Wayland Stallard
*Attorney, Agent, or Firm*—Oblon, Fisher, Spivak, McClelland & Maier

[57] ABSTRACT

A composite fine powder material is made of first particles with average particle diameter less than or equal to about ten microns, each having a composite structure and being made up of a plurality of fine second particles of a ceramic made by reacting together a first metal and a gas, embedded in a matrix of a second metal. This composite fine powder material is made by vaporizing the first metal, mixing the vapor with the gas, expanding the mixture through a first nozzle mechanism for providing adiabatic expansion cooling under reaction between the first metal and the gas to provide the fine second particles of ceramic, producing vapor of the second metal and mixing it in with the fine second particles at the downstream of the first nozzle mechanism, directing the resulting mixture through a second expansion nozzle mechanism to form the first particles of composite structure, and then collecting these first particles.

14 Claims, 4 Drawing Figures

0.1μ

0.1μ

FINE COMPOSITE POWDER MATERIAL AND METHOD AND APPARATUS FOR MAKING THE SAME

BACKGROUND OF THE INVENTION

The present invention relates to a fine composite powder material such as is suitable for use as a reinforcing material for a particle dispersion type composite material or as raw material for making sintered material, and to an apparatus and to a method for making such a material; and more particularly relates to a fine powder material the particles of which are made up in a composite structure and include extremely small ceramic particles in a matrix of metal, and to an apparatus and method for manufacturing this type of fine composite powder material.

The present invention was originally made in Japan, and the first patent application made therefor was Japanese Patent Application No. 81534/83, of which priority is being claimed in the present application; and it is hereby desired to incorporate the subject matter of that previous Japanese patent application into this specification by reference; a copy is appended to this specification.

Ceramics such as alumina, silicon nitride, tungsten carbide, and so on are far superior in heat resistance and wear resistance to metals, and therefore there have been in the past various attempts to make various structural members of various machines and devices out of composite materials in which ceramic powder particles are dispersed within a matrix of metal, as well as efforts to make materials out of sintered ceramic powder.

The problems with such composite materials made with ceramic reinforcing powder particles in matrix metal are that the reinforcing powder particles are extremely brittle, that it is difficult to uniformly disperse the reinforcing particles in the matrix metal, and that the intimacy between the reinforcing particles and the matrix metal is not always very good. Because of these problems, such composite materials are not in practice used very much, except for some tool materials such as cermet.

The problem of brittleness of the ceramic powder particles, encountered both in their use in reinforced materials and in sintered materials and in their use in sintered materials, might be thought to be solvable by using as particles small particles which themselves had a composite structure, being made of still finer ceramic particles set within a matrix of metal; but although such a substance can be conceived of in theory there has in the prior art been no practical way in which such fine composite powder particles could be made with an average particle diameter of 10 microns or less, which is a smallness which is necessary for their use as reinforcing powder particles. Therefore, up to the present, it has not been possible to manufacture a composite material or a sintered material utilizing such composite reinforcing powder particles.

SUMMARY OF THE INVENTION

In view of the above problems inherent in the prior art methods of making composite materials, especially composite materials which consist of matrix metal reinforced by particles which themselves are of a compound structure, and in making sintered materials, and with the expectation that such composite or sintered material would be superior in mechanical properties such as hardness, tensile strength, and wear resistance, the present inventors sought to provide reinforcing particles for a composite material or a sintered material which, being of average diameter 10 microns or less, themselves were made of composite material, and performed many experimental researches in this connection.

Accordingly, it is the primary object of the present invention to provide a fine composite powder material, a method for making it, and a device for practicing the method, which can efficiently and effectively be utilized in such composite or sintered material as outlined above in reasonable amounts.

It is a further object of the present invention to provide such fine composite powder material, and a method for making it and a device for practicing the method, which can produce a fine composite powder material which can be utilized as reinforcing material in making a composite material of superior mechanical properties.

According to the most general aspect of the present invention, these and other objects are accomplished by a composite fine powder material, comprising first particles with average particle diameter less than or equal to about ten microns, each having a composite structure and comprising a plurality of fine second particles of a ceramic and a matrix of a metal; by a device for making a composite fine powder material, comprising: a first vaporization chamber for producing a first metal vapor in; means for heating said first vaporization chamber; an exit flow path from said first vaporization chamber, comprising first expansion nozzle means therealong; means for introducing a flow of reaction gas to be mixed with said metal vapor at the upstream of said first nozzle means; a second vaporization chamber for producing a second metal vapor in; means for heating said second vaporization chamber; an exit flow path from said second vaporization chamber which leads into a mixing area where said second metal vapor is mixed with the mixture of said reaction gas and said first metal vapor after said mixture has flowed through said first nozzle means; second expansion nozzle means which leads from said mixing area; a composite fine powder material collection zone into which said second nozzle means leads; and means for evacuating the interior of said device; and by a method for making a composite fine powder material comprising first particles with average particle diameter less than or equal to about ten microns, each having a composite structure and comprising a plurality of fine second particles of a ceramic formed from a first metal combined with a gas embedded in a matrix of a second metal, comprising the steps of: mixing vapor of said first metal with said reaction gas and directing the mixture thereof through a first expansion nozzle means for adiabatic expansion cooling to generate fine particles of the compound of said first metal and said reaction gas; producing vapor of a second metal and mixing it in with said fine particles of said compound at the downstream of said first nozzle means; directing the resulting mixture through a second expansion nozzle means; and collecting particles from a jet flow from said second expansion nozzle means.

Since the particles of the fine composite powder material of the present invention are made of composite material having ceramic particles as reinforcing material embedded in matrix metal, their hardness is in principle close to that of the ceramic, while due to the presence of the matrix metal therein their toughness is also good (although these matters cannot be directly measured, due to the smallness of the particles). When used as reinforcing material mixed in a matrix metal to form a composite material, because due to their small size (much smaller than that practically attainable in the prior art, as desribed above) these reinforcing powder particles have very good affinity to the matrix metal, therefore they strongly oppose the movement of dislocations in the basic matrix metal, and also reduce the wear of the basic matrix metal. Also, since the affinity between the matrix material of the particles and the basic matrix metal is good, such composite material utilizing as reinforcing material fine composite powder particles according to the present invention is superior to conventional composite materials using reinforcing particles which are composed completely of ceramic, especially in toughness and shock resistance, and also in resistance to wear, and is particularly superior with regard to resistance to dropping off of the reinforcing particles during frictional rubbing against another body. Also, in the case of using the fine composite powder material of the present invention as raw material for making a sintered material, the resulting sintered material has extremely low porosity and is very densely packed, due again to the small size of the particles of the material of the present invention.

In general, the smaller the diameters of the fine particles of a composite material powder, the better the composite material powder is for use as raw material for making particle dispersion composite materials or sintered materials, because the better the mechanical properties of the composite or sintered materials become, in the case of a composite material due to the increase in the total surface area of the fine powder particles relative to their total weight, which increases the relative importance of their surface activity, and in the case of a sintered material due to the fact that decrease is thereby attained in the porosity of the sintered material produced. Further, in the case of a composite material, the better these reinforcing particles are dispersed in the matrix material and the higher the density at which they are dispersed, the better the mechanical properties of the resulting composite material are, both at normal temperatures and at high temperatures. This is because the strength of a composite material is largely determined by its resistance against deformation, and on the microscopic level deformation is a result of the formation and movement of dislocations. In particular, in a particle dispersion type composite material, it has already been clarified that the strength is improved due to the fact that the composite particles obstruct the movement of dislocations. For instance, tensile strength may be expressed by the formula:

$$t_y = t_m + Gmb/l$$

where $t_y$ is the yield stress, $t_m$ is the yield stress of the matrix material, b is the magnitude of the Berger spectrum, l is the average mean distance between particles, and Gm is the rigidity of the matrix material.

From this equation, it can be seen that the smaller the average distance between the particles of the reinforcing powder material, the greater the tensile strength of the composite material is.

Further, the following equation holds:

$$l = 2d(1 - Vp)/3Vp$$

where d is the size of the reinforcing particles, Vp is the volume ratio at which they are mixed, and l is the average mean distance between particles.

This means that the greater the volume ratio of the dispersed fine reinforcing powder particles is, and the smaller their diameter d is, the smaller becomes their average distance apart l. As a conclusion from these equations, therefore, the strength of a particle dispersion type composite material becomes greater, the finer is the dispersed composite material, and the higher is its packing density. Therefore, it has been realized for a long time that it is very desirable to make reinforcing powder for composite material with as small a particle diameter as possible, and energetic efforts have been expended with this aim in view. Thus, in the case of the fine composite powder material according to the present invention described above, since the average particle diameter of the particles thereof is of the order of ten microns or less (and preferably is of the order of five microns or less), it is far superior to any such material which might in the prior art have theoretically been able to be manufactured as dispersion powder material for a composite material by being made of small particles of ceramic embedded in a matrix of metal and formed by mechanical pulverization or the like, in its use in said composite material. Similar advantages accrue with regard to this use of this fine composite powder material as raw material for making sintered material.

The present inventors proposed in U.S. patent application Ser. No. 471,003, now U.S. Pat. No. 4,484,943, which is assigned to the same assignee as the present application, a method of making metallic compound fine powder by rapidly cooling a mixture of a gas and a metallic vapor which forms a compound with said gas, the meaning of "compound" being in this case intended as a chemical compound of a metal and a non-metallic element, a compound of metals, and a mixture of these with a metal or metals, and also showed that the purity of this metallic compound fine powder can be even further improved by utilizing a special type of divergent nozzle. The present invention takes these concepts as a point of departure, and elaborates upon those concepts by reacting a first metal vapor with a gas by adiabatic expansion cooling in first nozzle means to form a compound which is a ceramic in the form of extremely fine particles, and then mixes these extremely fine ceramic particles in with another metal vapor and by the use of second nozzle means condenses the resultant mixture by adiabatic expansion cooling to form fine particles of composite material with particle average diameter less than about ten microns. Optionally, these fine composite material particles may finally be directed into a bath of a matrix metal, to form a composite material including them, but this is not directly part of the present invention, and will not be particularly discussed hereinafter. In any case, since the surface activity of the fine powder particles according to the present invention is high, their affinity to and intimacy with the matrix metal with which they are being mixed to form a composite material are very good, and the evenness of their distribution in the matrix metal is also good, and thus the resulting composite material is excellent in its properties, particularly with regard to its structural integrity and lack of peeling off or coming away of the reinforcing particles thereof from the matrix metal.

With regard to the operating conditions of the first and the second nozzle means, they can be suitably tailored to the particular application. Suppose that the pressure and the temperature of the mixture gas upstream of the nozzle in which adiabatic cooling is performed are $P_1$ (expressed in torr) and $T_1$ (expressed in °K.) and the pressure and temperature of the mixture gas downstream of the nozzle are $P_2$ (again expressed in torr) and $T_2$ (again expressed in °K.), then in the case of a convergent-divergent nozzle the flow speed of the mixture gas passing through the convergent-divergent nozzle is supersonic when the pressure ratio $P_1/P_2$ is greater than or eqaul to 2.1. When the pressure ratio is relatively small (for instance when $P_1/P_2$ is equal to 2.5), even when it is within the said range so the downstream speed of the mixture gas is supersonic, the temperature $T_2$ of the gas after passing through the convergent-divergent nozzle is relatively high. The temperature $T_2$ may be approximately estimated from the following equation, where k is the specific heat ratio of the mixture gas:

$$T_2 = T_1 \times (P_2/P_1)^{(k-1)/k}$$

Further, in this method of manufacturing fine composite material particles according to the present invention, the reaction between the first metal vapor and the gas with which it is to combine follows the second law of thermodynamics. Thus, for instance, the reaction between metallic silicon vapor and nitrogen gas can be expressed by the following equation:

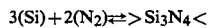

The change in the free energy $\Delta F$ in this equation can be expressed by the following equation:

$$\Delta F = \Delta F_0 + RT \ln \frac{1}{(P_{si})^3 \cdot (P_N)^2}$$

or by the following equation:

$$\Delta F = -495853 - 7.755T \log T + 205.22T - 4.575T \times (3 \log P_{si} + 2 \log P_{N2})$$

where $\Delta F_0$ is the standard free energy, R is the gas constant, T is the temperature, $P_{si}$ is the partial pressure of the silicon vapor, and $P_{N2}$ is the partial pressure of the nitrogen gas.

In the latter equation, when $\Delta F$ is negative, silicon nitride in the solid state is stable; whereas when $\Delta F$ is positive silicon vapor and nitrogen gas in the gaseous state are stable together. And the chemical reaction occurs faster as the temperature rises and slower as the temperature drops; and below a certain temperature there are certain combinations of temperature and pressure conditions at which the chemical reaction does not substantially advance at all, even when $\Delta F$ is negative.

Thus, by appropriately controlling the various parameters of the process such as the shape and dimensions of the nozzle means, the pressure conditions before and after the nozzle means, and the operating conditions of the nozzle means, it is thereby possible to make the desired composite fine powder material as a material in which each of the particles thereof is made of fine ceramic particles connected together by a metallic matrix, by suitably controlling the time interval at which the mixture of the first metal vapor and the gas with which it is to react is kept under temperature and pressure conditions in which the chemical reaction advances, by controlling the temperature and pressure conditions during the cooling process of the mixture gas, and by controlling the timing with which this mixture is mixed with the second metal vapor and the cooling of the resultant mixture. Thereby, it is possible to appropriately specify the average size of the fine reinforcing ceramic particles incorporated into the fine composite powder particles of the present invention, the volume ratio of the ceramic particles, the production rate of the fine composite powder, and its average particle diameter.

BRIEF DESCRIPTION OF THE DRAWINGS

The present invention will now be shown and described with reference to the preferred embodiment thereof, and with reference to the illustrative drawings. It should be clearly understood, however, that the description of the embodiments, and the drawings, are all of them given purely for the purposes of explanation and exemplification only, and are none of them intended to be limitative of the scope of the present invention in any way, since the scope of the present invention is to be defined solely by the legitimate and proper scope of the appended claims. In the drawings, like parts and features are denoted by like reference symbols in the various figures thereof, and:

DESCRIPTION OF THE PREFERRED EMBODIMENTS

The present invention will now be described with reference to the preferred embodiments thereof, and with reference to the appended drawings.

EMBODIMENT ONE

Figure 1:
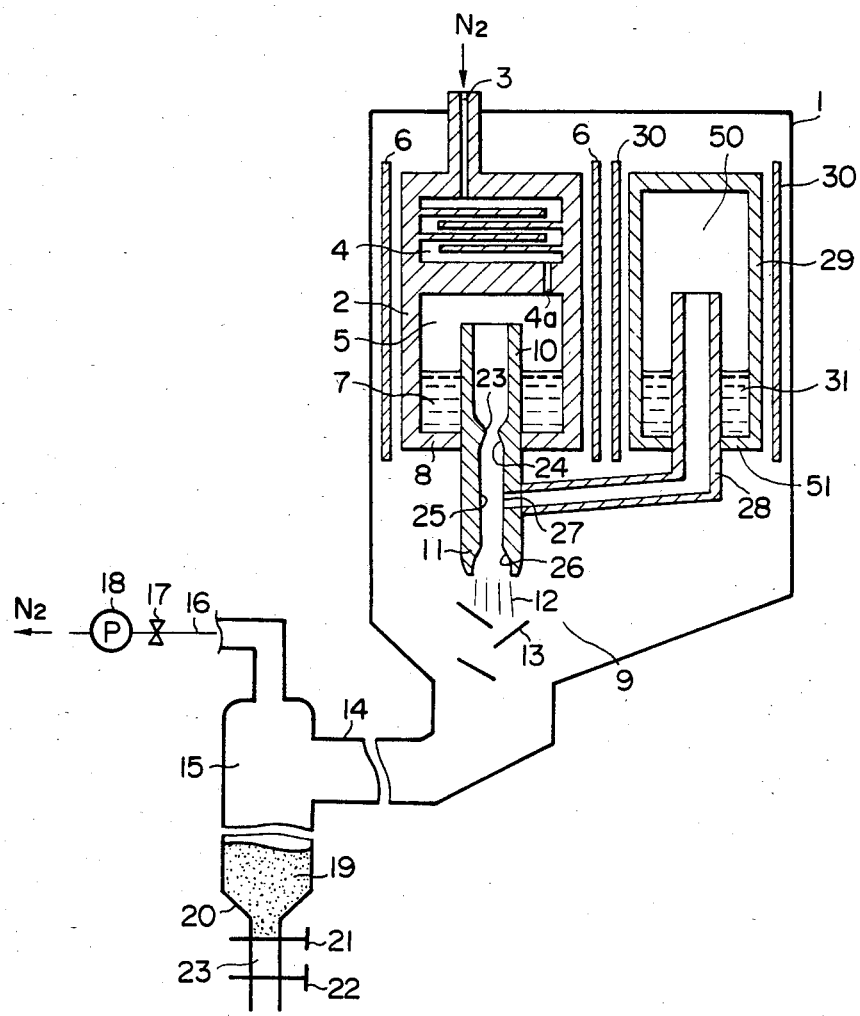
FIG. 1 is a schematic sectional view of an apparatus which is the first preferred embodiment of the device of the present invention and incorporates a convergent-divergent nozzle with two expansion portions, for making a composite fine powder which is a first preferred embodiment of the composite fine powder material of the present invention, in a manner according to the first preferred embodiment of the method of the present invention.

FIG. 1 shows a schematic cross section of the first preferred embodiment of the device for making composite fine powder material of the present invention. In this figure, the reference numeral 1 denotes a furnace shell which is formed as a substantially closed container. In the upper part of this furnace shell 1 there is disposed a first melting pot 2, the upper portion of which is formed with a gas preheating chamber 4 to which is communicated a gas introduction aperture 3 which is communicated with the outside for introduction of a reaction gas such as nitrogen gas, and the lower portion of which is formed with a metallic vapor production and reaction chamber 5 which is communicated via an aperture 4a with the gas preheating chamber 4. A heater 6 is disposed around the first melting pot 2 for keeping it at a predetermined temperature which will be hereinafter referred to as $T_1$, and a mass 7 of metal charged into the lower part of the metallic vapor production and reaction chamber 5 is kept in the molten state by the action of this heater 6 and is, further, boiled so as to emit metallic vapor.

Through the bottom wall 8 of the chamber 5 there is fitted a conduit 10 which leads to a composite powder material collection zone 9, and the upper end of this conduit 10 protrudes quite a long way into the chamber 5 so as to open to the upper portion of said metallic vapor production and reaction chamber 5, above the surface of the molten metal mass 7 therein. The interior of this conduit defines a nozzle 11, and this nozzle 11 opens downward into the composite powder material collection zone 9 so as to direct a jet flow 12 of gas and powder downwards thereinto as will be explaind shortly. Below the end of the nozzle 11 in the composite powder material collection zone 9 and displaced therefrom by a certain distance there are provided, for intercepting and decelerating fine composite powder particles produced in the jet flow 12 as will be explained shortly, opposing the tip of the convergent-divergent nozzle 11 at a certain distance away therefrom, a plurality of collision plates 13. A vacuum pump 18 is provided for exhausting, via a conduit 16 under the control of a valve 17, the reaction gas such as nitrogen gas introduced through the gas introduction aperture 3 from the composite powder material collection zone 9 and from the whole device, so as to maintain the interiors of the metallic vapor production and reaction chamber 5 and of the composite powder material collection zone 9 at predetermined pressures, which will be hereinafter referred to as $P_1$ and $P_2$ respectively. The lower part of the composite powder material collection zone 9 is formed as a tapered or funnel shape, which leads via a conduit 14 to a composite powder collection chamber 15. The lower part of this composite powder collection chamber 15 is also formed in a tapered shape 20, and leads to a conduit 23 which is controlled by two shut off valves 21 and 22 arranged in series.

The nozzle 11 has a throat portion 23, a first expansion portion 24 immediately downstream of said throat portion 23, a constant cross section portion 25 the upstream end of which is immediately downstream of said first expansion portion 24 and whose length is greater than its diameter, and a second expansion portion 26 immediately downstream of the downstream end of said constant cross section portion 25. And a gas introduction port 27 opens into said constant cross section portion 25 at an intermediate point thereof.

In the upper part of the furnace shell 1 there is disposed a second melting pot 29, which is formed with a metallic vapor production chamber 50 which is not communicated with any gas introduction port and to which no reaction gas is introduced. A heater 30 is disposed around the melting pot 29 for keeping it at a predetermined temperature which will be hereinafter referred to as $T_3$, and a mass 31 of metal charged into the lower part of the metallic vapor production chamber 50 is kept in the molten state by the action of this heater 30 and is, further, boiled so as to emit metallic vapor. Through the bottom wall 51 of the chamber 50 there is fitted a conduit 28, and the upper end of this conduit 28 protrudes quite a long way into the metallic vapor production chamber 50 so as to open to the upper portion of said chamber 50, above the surface of the molten metal mass 31 therein, while the lower end of the conduit 28 is connected to the gas introduction port 27 of the nozzle 11.

By using the device for making composite fine powder material shown in FIG. 1 and described above, composite material, the first preferred embodiment of the product of the present invention, a fine composite powder material consisting of powder particles each of which was made of extremely small reinforcing particles of silicon nitride embedded in a matrix of metallic silicon, was made according to the first preferred embodiment of the method of the present invention, as follows. First, a mass 7 of metallic silicon was charged into the lower part of the metallic vapor production and reaction chamber 6, and similarly a mass 31 of metallic silicon was charged into the lower part of the metallic vapor production chamber 50. Then the temperature of the first melting pot 2 and the chambers 4 and 5 defined therein was rapidly raised to a temperature $T_1$ of approximately 2200° C. by operating the heater 6, while a steady flow of nitrogen gas was introduced through the gas introduction aperture 3. Thus the silicon in the chamber 5 was melted, and was further steadily boiled to produce silicon vapor in the chamber 5, this silicon vapor mixing with the nitrogen gas flowing into said chamber 5 and starting to react therewith to produce silicon nitride. The mixture gas thus produced (in which the nitrogen gas was thus reacting with the silicon vapor) then entered the upper end of the conduit 10 and passed down through said conduit 10, to pass through the throat portion 23 of the nozzle 11 into the expansion portion 24 of said nozzle. In this expansion portion 24, the reaction mixture gas was cooled at a very high rate by adiabatic expansion cooling, to an estimated temperature of about 650° to 850° C., thereby producing very fine particles of silicon nitride. The flow out from this expansion portion 24, in which the reaction between the silicon and the nitrogen gas remaining was no longer occurring, then passed down the constant cross section portion 25 of the nozzle 11. Into this flow was then mixed a flow of silicon vapor which was produced by the silicon mass 31 in the metallic vapor production chamber 50 being melted by the operation of the heater 30, and being further steadily boiled to produce silicon vapor in the chamber 50 to a temperature of approximately 2000° C., said silicon vapor then passing down through the conduit 28 and through the gas introduction port 27. These mixed flows then flowed into the second expansion portion 26 of the nozzle 11, and were expelled as a jet flow 12 from the downstream end of said second expansion portion 26, i.e. from the outlet of the convergent-divergent nozzle 11, said jet flow 12 squirting into the composite powder material collection zone 9 and being directed downwards at the plates 13. During the above processing, the vacuum pump 18 was operated at such an appropriate rate, the valve 17 was so adjusted, and the flow rate of the nitrogen gas introduced through the gas introduction aperture 3 was so controlled, as to keep the pressure $P_1$ within the metallic vapor production and reaction chamber 5 at approximately 30 torr (the partial pressure of the silicon vapor, $P_{Si}$, was about 0.2 to 2 torr), this pressure being also dependent on the temperature at which the mass of metallic silicon 7 was heated up, and the pressure $P_2$ within the composite powder material collection zone 9 at approximately 1 to 3 torr.

During this process, the following chemico-physical reactions and processes are conjectured to have taken place, in view of the nature of the resultant product that was obtained which will be shortly described and in view of theory, although of course direct observation of what happened in the various portions of the nozzle 11 was quite impossible. The reaction mixture gas consisting of nitrogen gas and silicon vapor, as it passed through the first expansion portion 24 and was rapidly expanded and underwent rapid adiabatic cooling, formed extremely small particles of silicon nitride very quickly, so that the flow consisted substantially of a jet of said small particles of silicon nitride carried along on a flow of excess nitrogen gas, said particles having average diameter about 0.01 microns. Then, the silicon vapor injected through the gas introduction port 27 mixed with these small silicon nitride particles and with the excess nitrogen gas entered into the second expansion portion 26 of the nozzle 11, and underwent very rapid expansion and adiabatic cooling therein. At this time, the metallic silicon cooled into fine powder particles while entraining the small silicon nitride particles into said powder particles, and these fine powder particles were finally expelled from the nozzle 11 into the composite powder material collection zone 9 as the jet 12, which impinged on the plates 13. The fine powder particles in the jet flow 12 were thus decelerated, and settled in a mass to the bottom of the zone 9, while the excess nitrogen gas was continuously exhausted from the apparatus by the pump 18. The powder produced then flowed through the conduit 14 to enter the powder collection chamber 15, and to sink to the bottom 20 thereof to accumulate as a mass 20 of fine powder particles. From time to time, as appropriate, these fine powder particles were removed through the conduit 23 by appropriate alternative operation of the valves 21 and 22 in a per se obvious manner, while not substantially violating the pressure integrity of the device.

Figure 2:
FIG. 2 is a transmission electron micrograph of said first preferred embodiment of the composite fine powder material of the present invention produced by the apparatus of FIG. 1.
Figure 3:
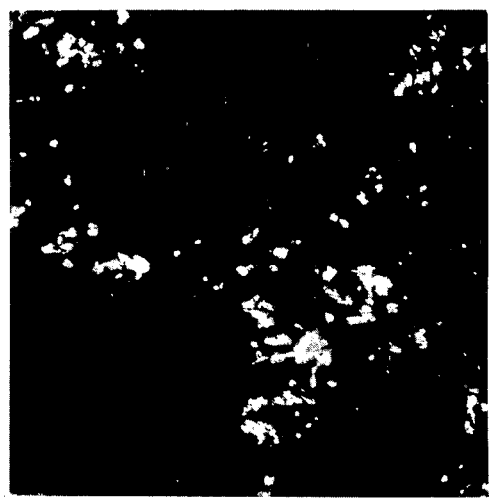
FIG. 3 is another transmission electron micrograph of said fine composite powder material taken against a dark background.
Figure 4:
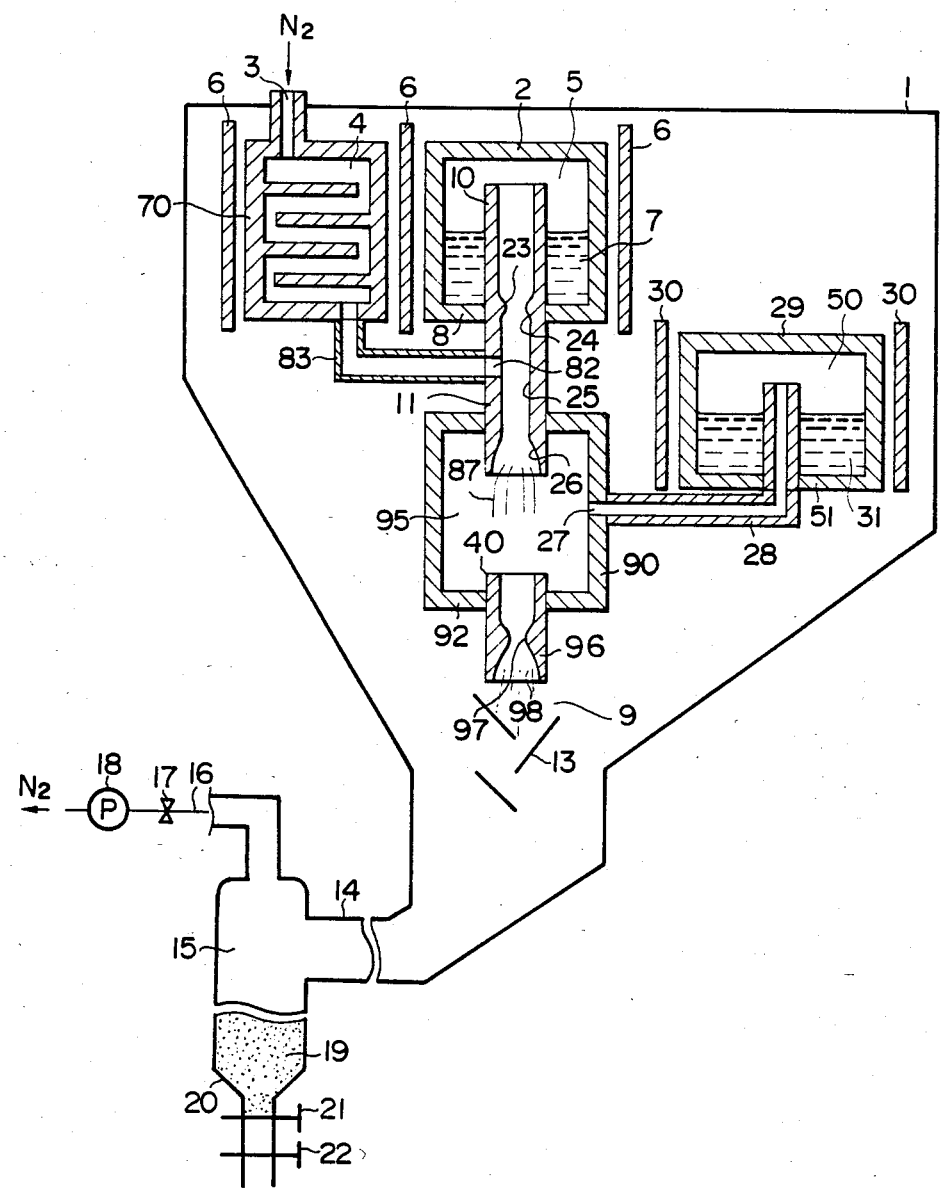
FIG. 4 is a schematic sectional view, similar to FIG. 1, of an apparatus which is the second preferred embodiment of the device of the present invention and this time incorporates two convergent-divergent nozzles connected by a mixing chamber, for making a composite fine powder material which is a second preferred embodiment of the composite fine powder material of the present invention, according to the second preferred method embodiment of the present invention.

FIG. 2 is a transmission electron micrograph of this fine composite powder material, i.e. of the first preferred embodiment of the powder material of the present invention, as produced by the apparatus of FIG. 1; and FIG. 4 is another transmission electron micrograph of said fine composite powder material taken against a dark background. It will be understood from these figures that the fine powder material has a structure in which its individual particles are themselves made up in a composite structure, each of them being composed of a number of extremely small silicon nitride particles (the white portions in FIG. 3) joined together by being embedded in a matrix of metallic silicon (the gray portions in FIG. 4). The average particle diameter of the fine composite powder was about 0.5 microns, while the average diameter of the small silicon nitride particles incorporated in the powder particles was about 0.01 microns. Because each particle of this fine composite powder material was very small, it was impossible to measure its hardness or its elasticity, but in view of its structure described above it is presumed that each of these particles had a hardness close to that of silicon nitride itself (and silicon nitride is a ceramic material which has extremely good hardness), and it is also presumed that each particle had a toughness much superior to that of a comparable particle made of silicon nitride alone (which would be rather brittle). Thus, it is presumed that the fine composite reinforcing particles according to the first preferred embodiment of the present invention had properties appropriate to a composite material, much improved over those of either of the two materials of which they were made, and thus combined the good advantages of both said component materials while avoiding their individual deficiencies, as is typical for such composite materials.

Next, hardness, tensile strength, and wear tests were made of a composite material utilizing as reinforcing material this fine composite powder material according to the first preferred embodiment of the present invention, and using magnesium alloy of JIS standard MC2F as matrix metal. First, it was determined that the volume ratio of the reinforcing fine powder material in this composite material was about 8 to 10%. In the case of the hardness tests at room temperature, the hardness of the composite material using as reinforcing material the composite fine powder material according to the present invention was found to be improved over the hardness of a pure magnesium alloy comparison sample by a factor of about 1.2. In the case of the tensile strength tests, the tensile strength of the composite material using as reinforcing material the composite fine powder material according to the present invention was found to be improved over the tensile strength of this pure magnesium alloy comparison sample by a factor of about 1.5. And in the case of the wear tests, which were performed based on the LFW method, with load 15 kg, test time 30 minutes, and using oil as a lubricant, the wear amount of the composite material using as reinforcing material the composite fine powder material according to the present invention was found to be better than that of a comparison sample using magnesium alloy as the matrix metal and fine 100% ceramic powder (in the same volume ratio) as the reinforcing material; and it was noticed, by observation of the surface of the test pieces after the wear test, that the composite material using as reinforcing material the composite fine powder reinforced material according to the present invention was far less prone to dropping out and scaling off of the fine powder reinforcing material, than was the comparison composite material sample.

Thus, it was found that a composite material using, as reinforcing powder material, composite powder according to the present invention in which the particle diameters of the ceramic material were very much smaller than those attainable in the case of pure ceramic powder was improved with regard to hardness and tensile strength thereof over composite material using pure ceramic powder particles as the reinforcing material, while also the wear resistance was improved and the tendency to deterioration during wear was greatly improved.

EMBODIMENT TWO

In FIG. 4, there is shown a schematic sectional view of the second preferred embodiment of the device for making a composite fine powder material of the present invention, in a fashion similarly to FIG. 1 with respect to the first apparatus embodiment. In this figure, parts which are similar to parts of the first preferred embodiment shown in FIG. 1 and which have the same functions are denoted by the same reference numerals.

In this second preferred apparatus embodiment, a furnace shell 1 is provided as before, and in the upper part of the furnace shell 1 there is disposed a first melting pot 2. There is also provided, separately from this first melting pot 2, a gas preheating device 70, within which there is defined a gas preheating chamber 4 to which is communicated a gas introduction aperture 3 which is communicated with the outside for introduction of a reaction gas such as nitrogen gas. The first melting pot 2 is formed with a first metallic vapor production chamber 5, and a heater 6 is disposed around the first melting pot 2 and the gas preheating device 70 for keeping them at a predetermined temperature which will be hereinafter referred to as $T_1$. A mass 7 of metal charged into the lower part of the first metallic vapor production chamber 5 is kept in the molten state by the action of this heater 6 and is, further, boiled so as to emit metallic vapor.

Through the bottom wall 8 of the chamber 5 there is fitted a conduit 10 which leads to a mixing chamber 95, defined within the body of a mixing device 90. The upper end of the conduit 10 protrudes quite a long way into the metallic vapor production chamber 5 so as to open to the upper portion of said chamber 5, above the surface of the molten metal mass 7 therein. The interior of the conduit 10 defines a first nozzle 11 which has a first gas introduction port 82 at an intermediate point therealong, and this first nozzle 11 opens downward into the mixing chamber 95 so as to direct a jet flow 87 of gas and powder downwards thereinto as will be explained shortly. Through the bottom wall 92 of the mixing chamber there is fitted a second nozzle 96 which leads to a composite powder material collection zone 9, and this second nozzle 96 opens downward into the composite powder material collection zone 9 so as to direct a jet flow 12 of gas and powder downwards thereinto. Through the bottom wall of the gas preheating device 70 there is fitted a conduit 83, and the lower end of the conduit 83 is connected to said first gas introduction port 82 of the first nozzle 11.

Below the end of the second nozzle 96 in the composite powder material collection zone 9 and displaced therefrom by a certain distance there are provided, as in the first embodiment of FIG. 1, opposing the tip of the second nozzle 96 at a certain distance away therefrom, a plurality of deceleration plates 13. A vacuum pump 18 is provided for exhausting, via a conduit 16 under the control of a valve 17, the reaction gas such as nitrogen gas introduced through the gas introduction aperture 3 from the composite powder material collection zone 9 and from the whole device, so as to maintain the interiors of the metallic vapor production chamber 5 and of the composite powder material collection zone 9 at predetermined pressures, which will be hereinafter referred to as $P_1$ and $P_2$ respectively. And as in the case of the first preferred embodiment a composite powder collection chamber 15 is provided as linked via a conduit 14 to the zone 9, and similar means including the valves 21 and 22 and the conduit 23 are provided for removing composite powder in the chamber 15 to the outside without deteriorating the gas tight condition of the device.

The first nozzle 11 has a throat portion 23, a first expansion portion 24 immediately downstream of said throat portion 23, a constant cross section portion 25 the upstream end of which is immediately downstream of said first expansion portion 24 and whose length is greater than its diameter, and a second expansion portion 26 immediately downstream of the downstream end of said constant cross section portion 25, while the first gas introduction port 82 opens into said constant cross section portion 25 at an intermediate point thereof. And the second nozzle 96 is of a per se well known convergent-divergent type, and has a throat portion 97 and an expansion portion 98 immediately downstream of said throat portion 97.

In the upper part of the furnace shell 1 there is disposed a second melting pot 29, which is formed with a second metallic vapor production chamber 50. A heater 30 is disposed around the melting pot 29 for keeping it at a predetermined temperature which wil be hereinafter referred to as $T_3$, and a mass 31 of metal charged into the lower part of the second metallic vapor production chamber 50 is kept in the molten state by the action of this heater 30 and is, further, boiled so as to emit metallic vapor. Through the bottom wall 51 of the chamber 50 there is fitted a conduit 28, and the upper end of this conduit 28 protrudes quite a long way into the second metallic vapor production chamber 50 so as to open to the upper portion of said chamber 50, while the lower end of the conduit 28 is connected to a second gas introduction port 27 which leads into the mixing chamber 95 of the mixing device 90.

As a modification, it would be possible for the exit opening of the first nozzle 11, i.e. the exit of the second expansion portion 26 thereof, to be located very close to the intake opening of the second nozzle 96, so as to provide a positive suction action for the gas issuing out from the second gas introduction port 27.

By using the device for making composite fine powder material shown in FIG. 4 and described above, a fine reinforced powder material each particle of which was made of extremely small reinforcing particles of aluminum nitride embedded in a matrix of metallic aluminum, was made according to the second preferred embodiment of the method of the present invention, as follows. First, a mass 7 of metallic aluminum was charged into the lower part of the first metallic vapor production chamber 5, and similarly a mass 31 of metallic aluminum was charged into the lower part of the second metallic vapor production chamber 50. Then the temperature of the first melting pot 2 and the chamber 5 defined therein was rapidly raised to a temperature $T_1$ of approximately 1900° C. by operating the heater 6, while concurrently the temperature of the gas preheating device 70 was raised to about 1500° C. or so by this heater action, while a steady flow of nitrogen gas was introduced through the gas introduction aperture 3. The vacuum pump 18 was operated at such an appropriate rate, the valve 17 was so adjusted, and the flow rate of the nitrogen gas introduced through the gas introduction aperture 3 was so controlled, as to keep the pressure $P_1$ within the first metallic vapor production chamber 5 at approximately 35 to 40 torr (of course this pressure was primarily determined by the temperature at which the mass 7 of metallic aluminum was heated up), and the pressure $P_2$ within the composite powder material collection zone 9 at approximately 1 to 3 torr. Thus the aluminum in the first metallic vapor production chamber 5 was melted, and was further steadily boiled to produce aluminum vapor in the chamber 5. The flow of this aluminum vapor then entered the upper end of the conduit 10 and passed down through said conduit 10, to pass through the throat portion 23 of the nozzle 11 into the expansion portion 24 of said nozzle. In this expansion portion 24, the aluminum vapor was cooled at a very high rate by adiabatic expansion cooling, to an estimated temperature of about 1500° C. or so and to an estimated pressure of 20 to 25 torr. The flow out from this expansion portion 24 of the nozzle 11 then passed down the constant cross section portion 25. Then this aluminum vapor, in the constant cross section portion 25, was mixed with the flow of nitrogen gas which was heated in the gas preheating device 70 to a temperature of also about 1500° C. and had flowed through the conduit 83 and through the first gas introduction port 83 into said constant cross section portion 25 of the nozzle 11, and the aluminum vapor and the nitrogen gas started to react together to produce aluminum nitride. This mixed flow then flowed into the second expansion portion 26 of the nozzle 11, and was expelled as a jet flow 87 from the downstream end of said second expansion portion 26, i.e. from the outlet of the nozzle 11, said jet flow 87 squirting into the chamber 95 of the mixing device 90, while being further subjected to rapid adiabatic expansion cooling and thus no further reaction having occurred. The chamber 95 was kept at a temperature of about 900° to 1100° C., and at a pressure of about 5 torr. A flow of aluminum vapor which was produced by the aluminum mass 31 in the second metallic vapor production chamber 50 being heatd by the operation of the heater 30 at an approximate temperature of 1700° C. and at a pressure of about 10 torr was introduced into the chamber 95 through the conduit 28 and through the gas introduction port 27 to be mixed with the above mixture of fine particles of aluminum nitride and nitrogen gas. These mixed flows then flowed into the second nozzle 96, and were expelled as a jet flow 12 from the downstream end of said second nozzle 96, and were cooled at a very high rate by adiabatic expansion cooling during passage through said second nozzle 96, said jet flow 12 squirting into the composite powder material collection zone 9 and being directed downwards at the deceleration plates 13.

During this process, similar chemico-physical reactions and processes as in the first embodiment are conjectured to have taken place, in view of the nature of the resultant product that was obtained which had a structure in which its individual particles were made up in a composite structure, each of them being composed of a number of extremely small aluminum nitride particles joined together by being embedded in a matrix of metallic aluminum. The average particle diameter of the fine composite powder was about 0.47 microns, and the sphericity of the powder particles was better than in the first embodiment described, while the average diameter of the small aluminum nitride particles incorporated in the powder particles was about 0.01 microns. Because each particle of this fine composite powder material was very small, it was again impossible to measure its hardness or its elasticity, but in view of its structure described above it is presumed that each of these particles had a hardness close to that of aluminum nitride itself (and aluminum nitride is a ceramic material which has extremely good hardness), and it is also presumed that each particle has a toughness much superior to that of a comparable particle made of aluminum nitride alone (which would be rather brittle). Thus, it is presumed that the fine composite reinforcing particles included in the second preferred embodiment of the composite material of the present invention had properties appropriate to a composite material, much improved over those of either of the two materials of which they were made, and thus combined the good advantages of both said component materials while avoiding their individual deficiencies, as is typical for such composite materials.

Next, hardness, tensile strength, and wear tests were made of a composite material utilizing as reinforcing material this fine composite powder material according to the first preferred embodiment of the present invention, and using magnesium alloy of JIS standard MC2F as matrix metal. First, it was determined that the volume ratio of the reinforcing fine powder material in this composite material was about 5 to 8%. In the case of the hardness tests at room temperature, the hardness of the composite material using as reinforcing material the composite fine powder material according to the present invention was found to be improved over the hardness of a pure magnesium alloy comparison sample by a factor of about 1.3 to 1.4. In the case of the tensile strength tests, the tensile strength of the composite material using as reinforcing material the composite fine powder material according to the present invention was found to be improved over the tensile strength of this pure magnesium alloy comparison sample by a factor of about 1.3. And in the case of the wear tests, which were performed based on the LFW method, with load 15 kg, test time 30 minutes, and using oil as a lubricant, the wear amount of the composite material using as reinforcing material the composite fine powder material according to the present invention was found to be better than that of a comparison sample using magnesium alloy as the matrix metal and fine 100% ceramic powder (in the same volume ratio) as the reinforcing material; and it was noticed, by observation of the surface of the test pieces after the wear test, that the composite material using as reinforcing material the composite fine powder reinforced material according to the present invention was far less prone to dropping out and scaling off of the fine powder reinforcing material, than was the comparison composite material sample.

Thus, it was again found that a composite material using, as reinforcing powder material, composite powder according to the present invention in which the particle diameters of the ceramic material were very much smaller than those attainable in the case of pure ceramic powder was improved with regard to hardness and tensile strength thereof over composite material using pure ceramic powder particles as the reinforcing material, while also the wear resistance was improved and the tendency to deterioration during wear was greatly improved.

Although the present invention has been shown and described with reference to the preferred embodiments thereof, and in terms of the illustrative drawings, it should not be considered as limited thereby. Various possible modifications, omissions, and alterations could be conceived of by one skilled in the art to the form and the content of any particular embodiment, without departing from the scope of the present invention. For example, the ceramic small particles included in the particles of the fine composite powder material according to this invention need not be particles of a nitride, as was exemplarily shown in the described embodiments, but could be made of other ceramic materials such as oxides, carbides, or borides of various metals. Other modifications are also possible. Also, it is not essential that the material which is reacted with the element in the gas to form the very small ceramic particles should be the same material as is used for the matrix material of the fine powder particles, although it is beneficial that the two materials should be the same from the point of view of obtaining good affinity between the ceramic particles and their matrix material. Therefore it is desired that the scope of the present invention, and of the protection sought to be granted by Letters Patent, should be defined not by any of the perhaps purely fortuitous details of the shown preferred embodiments, or of the drawings, but solely by the scope of the appended claims, which follow.

What is claimed is:

1. A composite fine powder material, comprising first particles with average particle diameter less than or equal to about ten microns, each having a composite structure and comprising a plurality of fine second particles of a ceramic formed from a first metal combined with a gas and substantially uniformly dispersed and embedded in a matrix of a second metal, produced by first mixing vapor of said first metal with said gas and directing the resulting mixture through a first expansion nozzle means for adiabatic expansion cooling to generate said fine second particles of said ceramic, then mixing said fine second particles of said ceramic with vapor of said second metal at a point downstream of said first nozzle means, and then directing the resulting mixture through a second expansion nozzle means for adiabatic expansion cooling to condense said vapor of said second metal while incorporating said second particles therein thereby to generate said first particles.

2. A composite fine powder material according to claim 1, wherein the average particle diameter of said first particles is less than or equal to about five microns.

3. A composite fine powder material, comprising first particles with average particle diameter less than or equal to about ten microns, each having a composite structure and comprising a plurality of fine second particles of a ceramic and a matrix of a metal wherein said matrix metal is silicon.

4. A composite fine powder material, comprising first particles with average particle diameter less than or equal to about ten microns, each having a composite structure and comprising a plurality of fine second particles of a ceramic and a matrix of a metal wherein said ceramic is silicon nitride.

5. A composite fine powder material according to claim 3, wherein said ceramic is silicon nitride.

6. A composite fine powder material, comprising first particles with average particle diameter less than or equal to about ten microns, each having a composite structure and comprising a plurality of fine second particles of a ceramic and a matrix of a metal wherein said matrix metal is aluminum.

7. A composite fine powder material, comprising first particles with average particle diameter less than or equal to about ten microns, each having a composite structure and comprising a plurality of fine second particles of a ceramic and a matrix of a metal wherein said ceramic is aluminum nitride.

8. A composite fine powder material according to claim 6, wherein said ceramic is aluminum nitride.

9. A device for making a composite fine powder material, comprising:
a first vaporization chamber for producing a first metal vapor in;
means for heating said first vaporization chamber;
an exit flow path from said first vaporization chamber, comprising a first expansion nozzle means therealong;
means for introducing a flow of reaction gas to be mixed with said metal vapor at the upstream of said first nozzle means;
a second vaporization chamber for producing a second metal vapor in;
means for heating said second vaporization chamber;
an exit flow path from said second vaporization chamber which leads into a mixing area where said second metal vapor is mixed with the mixture of said reaction gas and said first metal vapor after said mixture has flowed through said first nozzle means;
a second expansion nozzle means which leads from said mixing area;
a composite fine powder material collection zone into which said second nozzle means leads;
and means for evacuating the interior of said device.

10. A device according to claim 9, wherein said first and second nozzle means and said mixing area are constituted by a compound convergent-divergent nozzle which has a throat portion, a first expansion portion downstream of said throat portion, a constant cross sectional portion downstream of said first expansion portion whose length is greater than its diameter, and a second expansion portion downstream of said constant cross sectional portion; further comprising means for mixing said reaction gas into said first metal vapor at a point upstream of said throat portion of said compound nozzle, said mixture thereof then being fed into said compound nozzle; and further comprising means for introducing said second metal vapor into said constant cross section portion of said compound nozzle.

11. A device according to claim 9, wherein: said mixing area is defined as a mixing chamber; said first nozzle means is defined as a first compound convergent-divergent nozzle which has a throat portion, a first expansion portion downstream of said throat portion, a constant cross sectional portion downstream of said first expansion portion whose length is greater than its diameter, and a second expansion portion downstream of said constant cross sectional portion which opens into said mixing chamber; and said second nozzle means is defined as a second convergent-divergent nozzle which leads from said mixing chamber to said composite fine powder material collection zone; further comprising means for introducing said reaction gas into said constant cross sectional portion of said first compound nozzle; and further comprising means for introducing said second metal vapor into said mixing chamber.

12. A method for making a composite fine powder material comprising first particles with average particle diameter less than or equal to about ten microns, each having a composite structure and comprising a plurality of fine second particles of a ceramic formed from a first metal combined with a gas embedded in a matrix of a second metal, comprising the steps of:
mixing vapor of said first metal with said reaction gas and directing the mixture thereof through a first expansion nozzle means for adiabatic expansion cooling to generate fine particles of the compound of said first metal and said reaction gas;
producing vapor of a second metal and mixing it in with said fine particles of said compound at the downstream of said first nozzle means;
directing the resulting mixture through a second expansion nozzle means; and
collecting particles from a jet flow from said second expansoin nozzle means.

13. A method according to claim 12, wherein said first and second nozzle means are constituted by a compound convergent-divergent nozzle which has a throat portion, a first expansion portion downstream of said throat portion, a constant cross sectional portion downstream of said first expansion portion whose length is greater than its diameter, and a second expansion portion downstream of said constant cross sectional portion; and wherein said reaction gas is mixed into said vapor of said first metal at a point upstream of said throat portion of said compound nozzle, said mixture thereof then being fed into said compound nozzle; and wherein said vapor of said second metal is mixed into said fine particles of said compound by being supplied into said constant cross sectional portion of said compound nozzle.

14. A method according to claim 12, wherein said first nozzle means is defined as a first compound convergent-divergent nozzle which has a throat portion, a first expansion portion downstream of said throat portion, a constant cross sectional portion downstream of said first expansion portion whose length is greater than its diameter, and a second expansion portion downstream of said constant cross sectional portion which opens into a mixing chamber, and said second nozzle means is defined as a second convergent-divergent nozzle which leads from said mixing chamber to direct its output flow at said bath of said first metal; wherein said vapor of said first metal is supplied into said first compound nozzle; wherein said reaction gas is mixed into said vapor of said first metal by being supplied into said constant cross sectional portion of said first compound nozzle; and wherein said vapor of said second metal is mixed into said fine particles of said compound by being supplied into said mixing chamber.

* * * * *